Patented Sept. 4, 1951

2,566,821

UNITED STATES PATENT OFFICE 2,566,821

POLYMERIZATION OF BUTADIENE-1,3 HYDROCARBONS IN AQUEOUS EMULSION IN THE PRESENCE OF A FERRICYANIDE, A DIAZOMERCAPTO COMPOUND, AND AN ALCOHOL

Harold P. Brown, Akron, Ohio, and Robert J. Houston, Fairfax, Calif., assignors to The B. F. Goodrich Company, New York, N. Y., a corporation of New York No Drawing. Application December 3, 1947, Serial No. 789,560

9 Claims. (Cl. 260—84.1)

This invention relates to the polymerization of butadiene-1,3 hydrocarbons in aqueous emulsion to yield rubber-like materials and particularly pertains to a method of increasing the rate of such polymerizations.

It is known that the polymerization of butadiene-1,3 hydrocarbons either alone or in admixture with unsaturated compounds copolymerizable therewith such as styrene and acrylonitrile, may be effected in aqueous emulsions containing emulsifying agents, catalysts and the like. It is also known that the rubber-like polymers obtained possess especially desirable properties when the polymerization is effected at moderate or at relatively low temperatures. The rate of polymerization attainable at lower temperatures, for example 0° C. to 30° C., however, has not been as rapid as is desired.

We have now discovered that the rate of polymerization of butadiene-1,3 hydrocarbons in aqueous emulsion may be greatly increased, especially at lower temperatures, and that excellent rubber-like polymers may be produced, by carrying out the polymerization in the presence of a combination of substances, one of which is an alkali metal or ammonium ferricyanide, another of which is a diazomercapto compound and a third of which is a liquid, water-miscible alcohol.

By the use of a substance from each of these three classes, it has become possible to carry out the polymerization of butadiene-1,3 hydrocarbons in a very short time, a time much shorter in fact than when any one of the three substances is omitted.

The water-miscible alcohols which are useful in the practice of this invention include monohydroxy and polyhydroxy alcohols such as methanol, ethanol, beta-ethoxy ethanol, propanol, isopropanol, butanol, ethylene glycol, diethylene glycol, diethylene glycol monoethyl ether, glycerol, and other liquid alcohols miscible with water and composed exclusively of carbon, hydrogen and oxy-oxygen atoms. In addition, there may be used other compounds which will yield an alcohol in situ under the polymerization conditions employed. For example, methylal (or methylene dimethyl ether) having the structure $CH_3-O-CH_2-O-CH_3$ decomposes in aqueous solution in the presence of an alkali hydroxide to yield formaldehyde and methyl alcohol and may be added in place of an alcohol when the emulsion contains alkali. Similarly, esters such as ethyl acetate which are saponified in aqueous solution to give alcohols may likewise be used when the emulsion contains a saponification agent such as sodium hydroxide. It will be understood, therefore, that regardless of whether an alcohol is added as such to the emulsion or is formed in situ, the polymerization will be effected in the presence of an alcohol. Addition of the alcohol as such to the aqueous phase of the emulsion is, however, the ordinary method of practicing the invention and is preferred.

Any of the aromatic diazomercapto compounds, i. e., a compound wherein a diazo linkage is attached on one hand to a carbon atom occurring in an aromatic hydrocarbon radical, and on the other hand to a mercaptosulfur atom may be employed together with the alcohol to increase the rate and speed of polymerization according to the method of this invention. Such compounds may be represented by the general formula Ar—N=N—S—R wherein Ar is an aromatic radical and R is a monovalent organic radical having its connecting valence on a carbon atom, such as the various aryl, alkyl, substituted aryl and alkyl groups, alicyclic and heterocyclic groups, and substituted alicyclic and heterocyclic groups.

A preferred group of diazomercapto compounds for use in this invention are those of the above general structure in which R is a cyclic group having its connecting valence on a carbon atom such as phenyl, tolyl, xylyl, naphthyl, benzothiazyl, 3,4-dimethyl thiazyl, and 4-phenylthiazyl groups and the like. Illustrative examples of this preferred group of diazomercapto compounds are:

2-(4 - methoxybenzenediazomercapto) naphthalene
2-(4-methylbenzenediazomercapto) naphthalene
2-(benzenediazomercapto) naphthalene
2-(2-naphthalenediazomercapto) naphthalene
2-(1-naphthalenediazomercapto) naphthalene
2-(4-phenylbenzenediazomercapto) naphthalene
2-(3-methylbenzenediazomercapto) naphthalene
2-(2-methylbenzenediazomercapto) naphthalene
2-(2,4-dimethylbenzenediazomercapto) naphthalene 2-(3,4-dimethylbenzenediazomercapto) naphthalene
2-(2,5 - dimethoxybenzenediazomercapto) naphthalene
2-(4 - tertamylbenzenediazomercapto) naphthalene
2-(2 - methoxybenzenediazomercapto) naphthalene
2-(4-chlorobenzenediazomercapto) naphthalene
2-(2-chlorobenzenediazomercapto) naphthalene
2-(4-ethoxybenzenediazomercapto) naphthalene
Sodium salt of 2-(4-carboxymethylbenzenediazomercapto) naphthalene
Sodium salt of 2-(4-sulfobenzenediazomercapto) naphthalene
(2-naphthalenediazomercapto) benzene
4-(2-naphthalenediazomercapto) toluene
4-(2,5-dimethoxybenzenediazomercapto) toluene
4-(p-methoxybenzenediazomercapto) chlorobenzene
Sodium salt of 2-(2,5-dimethoxybenzenediazomercapto) benzoic acid
Sodium salt of 4-(4-sulfobenzenediazomercapto) toluene
Sodium salt of 3-(4-sulfobenzenediazomercapto) toluene
Sodium salt of 2-(4-sulfobenzenediazomercapto) toluene
Sodium salt of 2-(4-sulfobenzenediazomercapto) benzothiazole
Sodium salt of (4-sulfobenediazomercapto) benzene
Disodium salt of 2-(4-sulfobenzenediazomercapto) benzoic acid
Sodium salt of 2-(4-carboxybenzenediazomercapto) benzothiazole
Sodium salt of 2-(benzenediazomercapto) benzoic acid
Sodium salt of 2-(naphthalenediazomercapto) benzoic acid
2-(benzenediazomercapto) benzothiazole
2-(4-methoxybenzenediazomercapto) - 3,4 - dimethylthiazole
2-(benzenediazomercapto)-4-phenylthiazole
Sodium salt of 4-(carboxybenzenediazomercapto) toluene
2-(4-acetylbenzenediazomercapto) naphthalene Even more preferred are those compounds of this class in which the aromatic group (Ar) attached to the diazo linkage is a substituted phenyl group such as an alkoxy-substituted phenyl, alkyl-phenyl or chlorophenyl group, and the R group attached to the mercaptan sulfur atom is an aryl group such as a phenyl, tolyl, xylyl, or naphthyl group preferably the latter. Thus, especially useful compounds are:

2 - (4 - methoxybenzenediazomercapto) naphthalene
2 - (4 - methylbenzenediazomercapto) naphthalene
2 - (2,4-dimethoxybenzenediazomercapto) naphthalene
2 - (3,4 - dimethylbenzenediazomercapto) naphthalene
2 - (4 - chlorobenzenediazomercapto) naphthalene The R group need not be cyclic, however, since compounds in which R is aliphatic may also be used. Examples of such compounds are:

1 - (4 - chlorobenzenediazomercapto) - 1,1 - dimethyl ethane
(4-chlorobenzenediazomercapto)-tert. octane
1-(4-chlorobenzenediazomercapto) dodecane
2'-(4-chlorobenzenediazomercapto) ethyl 10-hydroxy octadecanoate
1-(4-chlorobenzenediazomercapto) hexadecane
B - (4-chlorobenzenediazomercapto) B'-(4-tert. octyl phenoxy) diethyl ether
(4 - chlorobenzenediazomercapto) - tert - dodecane The above-described diazomercapto compounds are made in a manner well known to the art involving the coupling of a diazotized aromatic amine with an appropriate mercaptan. The coupling reaction may be carried out either in alkaline aqueous solution in which the excess alkalinity is preferably derived from sodium bicarbonate (if the reactants are sufficiently soluble in such a medium) or in glacial acetic acid. The diazomercapto compound may be used in the crude form without purification for we have discovered that no significant increase in activity of the diazomercapto compound is obtained by the use of recrystallized products.

In the practice of the invention, an aqueous emulsion containing as the dispersed phase, a monomeric material comprising a butadiene-1,3 hydrocarbon, such as monomeric butadiene-1,3 itself or a mixture of butadiene-1,3 and styrene or acrylonitrile, and also containing an emulsifying agent such as the sodium and potassium soaps of the fatty acids or disproportionated rosin acids is supplied with each of the three materials mentioned above, i. e., a water-miscible aliphatic alcohol, a water-soluble ferricyanide, and one of the above-described diazomercapto compounds, and the monomeric material is then polymerized. A polymerization modifier such as aliphatic mercaptan is also preferably but not necessarily included in the emulsion during the polymerization.

Polymerization of the monomeric material in the aqueous emulsion is effected, preferably with agitation, at a temperature between about 10° C. and about 100° C., and preferably at a temperature of 10° to 40° C., for a time sufficient to convert a substantial proportion, say from 20 to 100% of the monomeric material into polymer. The polymerization reaction in the presence of the diazomercapto compounds is not sensitive to the presence of gaseous oxygen as are polymerization reactions carried out in the presence of other known initiators, activators, etc., though most satisfactory results are obtained in the absence of, or in the presence of low concentrations of, gaseous oxygen or in the presence of an inert atmosphere such as nitrogen.

The polymerization reaction, in some instances, is desirably terminated before 100% yield, by the addition of polymerization inhibitors such as hydroquinone or phenyl beta naphthylamine. In any case, the polymeric product is obtained as a synthetic rubber latex which may be treated subsequently to remove unpolymerized monomers, and used as a latex, or coagulated by the addition of coagulants such as sodium chloride and a strong mineral acid such as sulfuric acid to produce a crude solid synthetic rubber.

To further illustrate the practice of the invention in preferred embodiments and the improved results to be obtained thereby, the following specific examples are set forth, though in no wise is the invention to be construed as limited thereto. In the examples all parts are by weight.

Examples 1 to 10

In each of the following examples, and in the control reactions, aqueous emulsions were prepared using the following basic recipes:

|  | Recipe 1 | Recipe 2 |
|---|---|---|
|  | Parts | Parts |
| Butadiene-1,3 | 75 | 75 |
| Styrene | 25 | 25 |
| Water | 180 | 250 |
| Fatty acid soap | 5 | 5 |
| Tert-dodecyl mercaptan | 0.3 | 0.3 |
| Potassium ferricyanide | 0.3 | 0.3 |
| 2-(4-methoxybenzenediazomercapto) naphthalene | 0.2 | 0.2 |
| Trisodium phosphate ($Na_3PO_4 \cdot 12 H_2O$) | 1.0 | 0.5 |
| Sodium Hydroxide | 0.065 | 0.03 |

These basic recipes were varied by the inclusion therein of various amounts of aliphatic alcohols. The materials were placed either in crown glass bottles which were agitated by tumbling end over end in a water bath or in a stainless steel bomb having a paddle-type agitator. The reaction vessel was placed in a bath of water maintained at a constant temperature of 30° C. for varying periods of time. The course and rate of the polymerization reaction in each case was followed by total solids determinations performed on samples removed from the polymerization vessel by a hypodermic syringe inserted into the vessel through a self-sealing stopper or diaphragm. The basic recipe used and the nature and amount of added alcohol, together with yield of polymer obtained in recited intervals of time are shown in the following table.

|  | Recipe Used | Nature and Amount of Alcohol | Time, Hrs. | Yield, Per Cent |
|---|---|---|---|---|
| Control A | (1) | none | 0.5 | 37.0 |
|  |  |  | 0.8 | 56.7 |
|  |  |  | 1.2 | 71.5 |
| Example 1 | (1) | 1 part ethanol | 0.5 | 44.0 |
|  |  |  | 0.8 | 62.0 |
|  |  |  | 1.2 | 74.0 |
| Example 2 | (1) | 5 parts ethanol | 0.5 | 60.0 |
|  |  |  | 0.8 | 72.0 |
|  |  |  | 1.2 | 79.5 |
| Example 3 | (1) | 15 parts ethanol | 0.5 | 67.5 |
|  |  |  | 0.8 | 71.0 |
|  |  |  | 1.2 | 72.5 |
| Example 4 | (1) | 25 parts ethanol | 0.4 | 55.0 |
|  |  |  | 0.8 | 66.5 |
|  |  |  | 1.2 | 78.5 |
| Example 5 | (1) | 10 parts methanol | 0.4 | 42.5 |
|  |  |  | 0.8 | 67.0 |
|  |  |  | 1.2 | 80.5 |
| Example 6 | (1) | 2 parts n-butanol | 0.4 | 45.0 |
|  |  |  | 0.8 | 63.0 |
|  |  |  | 1.2 | 78.0 |
| Example 7 | (1) | 7 parts n-butanol | 0.4 | 60.0 |
|  |  |  | 0.8 | 76.0 |
|  |  |  | 1.2 | 82.5 |
| Example 8 | (1) | 15 parts glycerol | 0.4 | 47.5 |
|  |  |  | 0.8 | 73.0 |
|  |  |  | 1.2 | 83.5 |
| Control B | (2) | None | 0.4 | 39.0 |
|  |  |  | 0.8 | 69.0 |
|  |  |  | 1.2 | 83.0 |
| Example 9 | (2) | 7 parts ethanol | 0.4 | 57.5 |
|  |  |  | 0.8 | 80.0 |
|  |  |  | 1.2 | 85.0 |
| Example 10 | (2) | 15 parts ethanol | 0.4 | 65.0 |
|  |  |  | 0.8 | 81.0 |
|  |  |  | 1.2 | 82.5 |

It is apparent from a consideration of the above table that the polymerization is effected in a much shorter time in the presence of the added alcohol than in its absence. The rapid reaction rates obtainable in the presence of alcohol are not secured, however, in the absence of either or both of the ferricyanide and the diazomercapto compound.

It will be noted that the amount of alcohol may be varied from as little as 1 part to as high as 25 parts with marked increases in reaction rate. Amounts as high as 50 parts or more may also be used to advantage, especially if it is desirable to conduct the polymerization at temperatures considerably below 0° C., since the greater the quantity of alcohol the lower the freezing point of the emulsion.

It will also be noted from the above table that the polymerization proceeds to higher conversion in a short time when using recipe (2), which utilizes 250 parts of water to 100 parts of the monomer material, than when using recipe (1), which utilizes only 180 parts of water. Thus, with the combination of ferricyanide, alcohol and diazomercapto compound an advantageous "dilution effect" is observed, although this is not the case with most emulsion polymerizations. It should be understood, however, that the amount of water present in the polymerization emulsion is not critical and may be varied from as little as 100 parts to as high as 600 parts or more, based on 100 parts of monomeric material, although, because of the "dilution effect," the use of moderately dilute polymerization mixtures containing from 180 to 400 parts of water to each 100 parts of monomers is preferred.

Numerous other variations in the above specific examples may be effected without changing the nature of the results. As mentioned hereinabove, the temperature of the polymerization may be varied widely; at any given temperature the reaction rate is more rapid in the presence of the alcohol than in its absence and is more rapid in the presence of each of the three essential ingredients than in the absence of either of them.

The nature and amount of the materials in the emulsion may also be varied quite widely while still obtaining the advantages described. The amount of diazomercapto compound may be varied from that given in the examples, and any of the diazomercapto compounds mentioned hereinabove may be substituted for the 2-(4-methoxy-benzene-diazomercapto) naphthalene used in the above examples, with only slight variations in polymerization rate. For example, the use of only 0.16 part of 2-(2-methylbenzenediazomercapto) naphthalene can effect polymerization of the monomeric mixture used in the examples to a yield of 70 to 80% in 2 hours at 30° C. Similarly, the presence of 0.17 part of 2-(2,4-dimethylbenzenediazomercapto) naphthalene causes this monomeric mixture to be polymerized at 30° C. to a yield of 75% in 2 hours. Still better results are obtained by the use of 0.18 part of 2-(2,5-dimethoxybenzenediazomercapto) naphthalene, the 75/25 mixture of butadiene and styrene polymerizing to yield 71% in 1.6 hours at 30° C. In addition, polymerization of the monomeric mixture used in the examples may be effected in aqueous emulsion in the presence of 0.10 to 0.40 part per 100 parts of monomers of the following diazomercapto compounds.

(2-naphthalenediazomercapto) benzene
4-(2-naphthalenediazomercapto) toluene
Sodium salt of 2-(4-sulfobenzenediazomercapto) benzothiazole
4-(p-methoxybenzenediazomercapto) chlorobenzene at temperatures ranging from 10 to 30° C. to produce yields of polymers of 60 to 80% in 1 to 2 hours. From the foregoing, it is seen that in general 0.1 to 0.40% based on the monomers of any of the above-mentioned diazomercapto compound may be substituted for the specific amount of the diazomercapto compound of the examples, with substantially equivalent results. Even larger amounts, say 0.50 to 0.75 or 1.0% may be used with good results.

The amount of soluble ferricyanide catalyst may also be varied within wide limits. Maximum initial polymerization rates may be obtained with as little as 0.10 to 0.20 part potassium ferricyanide per hundred of monomers while polymerization in the presence of 0.25 to 0.30 part proceeds somewhat more slowly but continues to higher conversions. Excellent yields of 70 to 80% may be obtained in 1 to 2 hours by the use of 0.35 to 0.50 or even 0.75 to 1.00%, based on the monomers, of sodium, potassium, or ammonium ferricyanide. The optimum amount of ferricyanide will depend on whether it is desired to carry the polymerization to high conversion or whether it is desired to obtain a high initial rate of reaction to a conversion of about 70% and then to remove the unreacted monomers.

In Examples 1 to 10 the emulsions contained, in addition to monomers and the combination of alcohol, ferricyanide and diazomercapto compound, a small amount of tert-dodecyl mercaptan, present as a polymerization modifier, i. e., an organic substance which increases the plasticity and solubility of butadiene-1,3 polymers prepared in its presence. Other modifiers may also be used in place of this mercaptan or it may be desirable to carry out the polymerization reaction in the absence of any modifier whatever. In the latter case the rate of polymerization is substantially as rapid but the polymer secured is tougher and less plastic. Modifiers which may be used include the aliphatic mercaptans, the aliphatic groups of which contain 4 or more carbon atoms, such as n-octyl mercaptan, n-decyl mercaptan, n-dodecyl mercaptan, cetyl mercaptan and other primary mercaptans, and secondary and tertiary mercaptans (the latter being preferred) such as tertiary butyl mercaptan; triisobutyl mercaptan, tertiary-dodecyl mercaptan, tertiary $C_{14}$ and $C_{16}$ mercaptans, and the like. Other sulfur-containing compounds which are modifiers may be used including the bis-(alkyl xanthogens) such as bis-(isopropyl) xanthogen and the like, 2-mercaptothiazoles and their sulfides and polysulfides such as 4-phenyl-2-mercaptothiazole, bis - (4 - phenyl thiazyl-2) disulfides and the like, thiuram mono- and poly-sulfides such as tetramethyl thiuram disulfide and the like, as well as numerous other sulfur-containing compounds having the property of increasing the plasticity and solubility of butadiene-1,3 hydrocarbon polymers prepared in their presence.

The process of trisodium phosphate and sodium hydroxide in Examples 1 to 10 maintains the pH of the emulsions in the range of 10 to 12. While polymerization at this pH is desirable, especially when a mercaptan modifier is used, it should be understood that the precise pH is not a critical facor of this invention and that pH may be varied widely. Polymerization in an alkaline system, pH of 7 to 14, is, however, more rapid than when the pH is below 7, and is preferred.

The monomeric material polymerized may be varied considerably so long as it comprises a butadiene-1,3 hydrocarbon such as butadiene-1,3, isoprene, 2,3-dimethyl butadiene-1,3, piperylene, 3-methyl pentadiene-1,3, (3,4-dimethyl butadiene-1,3) or the like. It may consist of a butadiene-1,3 hydrocarbon alone, a mixture of one or more butadiene-1,3 hydrocarbons or a mixture of one or more butadiene-1,3 hydrocarbons with other monomeric materials known to be copolymerizable therewith in aqueous emulsion. Examples of such copolymerizable monomers include unsaturated organic compounds containing a single olefinic double bond such as styrene (a preferred comonomer), alpha-methyl styrene, p-chloro-styrene, 3,5-dichloro-styrene, p-methoxy styrene, vinyl naphthalene, acrylonitrile (another preferred comonomer), methacrylonitrile, alpha-chloro-acrylonitrile, methyl acrylate, ethyl acrylate, methyl methacrylate, butyl ethacrylate, methacrylamide, vinyl methyl ketone, vinyl pyridine, vinyl carbazole, vinyl methyl ether, vinyl acetate, vinylidene chloride, diethyl fumarate, vinyl acetylene, isobutylene, ethylene, and other similar monoolefinic polymerizable compounds; as well as unsaturated compounds containing more than one olefinic double bond including in addition to the butadiene-1,3 hydrocarbons, other conjugated dienes such as chloroprene, 3-cyano butadiene-1,3, and cyclopentadiene, and trienes such as myrcene and the like. When polymerizing a butadiene-1,3 hydrocarbon with copolymerizable compounds, it is preferable to employ a mixture of butadiene-1,3 with from one-tenth to two times as much by weight of one or more copolymerizable compounds each of which contains a $CH_2=C<$ group attached by at least one of the disconnected valences to a chlorine atom, an oxygen atom, or a plurally bound carbon atom such as is present in an aryl group, a cyano group or a carbonyl group.

Results similar to those of Examples 1 to 10 are obtained with monomeric mixtures other than the butadiene styrene mixture of these examples. For example, using the diazomercapto compound of Examples 1 to 10, a mixture composed of 75 parts of butadiene-1,3, 15 parts styrene and 10 parts acrylonitrile polymerized at acrylonitrile polymerized at 30° C. to a yield of 30° C. to a yield of 89.0% in 2 hours; a mixture consisting of 75 parts butadiene-1,3 and 25 parts acrylonitrile polymerized at 30° C. to a yield of 89.5% in 24 minutes; a mixture consisting of 65 parts butadiene-1,3 and 35 parts acrylonitrile polymerized at 30° C. to a yield of 94% in 24 minutes; a mixture consisting of 75 parts butadiene-1,3, 20 parts of styrene and 5 parts of acrylonitrile polymerized at 10° C. to a yield of 78.5 in 4 hours; and a mixture consisting of 75 parts butadiene-1,3 and 25 parts styrene polymerized at 10° C. to a yield above 65% in 5 hours.

Many variations in the nature of the emulsifying agent used to form the emulsion of the butadiene-1,3 hydrocarbon may also be made. In general emulsifying agents which are anionic in nature are preferably used. Illustrative examples of such emulsifying agents include the sodium and potassium soaps of the fatty acids such as sodium oleate, sodium myristate, potassium palmitate; sodium rosin acid soap and sodium dehydrogenated (or disproportionated) rosin acid soap (a preferred emulsifier for low temperature polymerization) and other synthetic saponaceous materials, such as hymolal sulfates and alkaryl sulfonates; for example, sodium lauryl sulfate and sodium isopropyl naphthalene sulfonate. Cationic emulsifiers such as salts of organic bases containing long carbon chains, such as the hydrochloride of diethylaminoethyloleylamide, trimethyl cetyl ammonium bromide and the like may also be used, if desired, as may any other emulsifying agent capable of maintaining the monomeric material in an emulsified condition.

The amount of emulsifier may also be varied with certain advantageous results. In general, polymerization rates increase as the concentration of the emulsifier in the system is increased. Generally, 1 to 5% (on the monomers) of the emulsifier will be found satisfactory though the use of 5% additional emulsifier results in a slightly faster reaction and in slightly higher conversion.

Not only does the use of the combination of a ferricyanide, a diazomercapto compound and a water-miscible aliphatic alcohol make possible more rapid polymerizations but also, because polymerization may be effected in reasonable time at a temperature of 10° C., a desirable improvement in physical properties of the polymer is made possible on a commercial scale. The following example is illustrative of the improvement in physical properties of the polymers obtainable by this new method of polymerization.

*Example 11*

A polymer produced from a mixture of 75 parts butadiene-1,3 and 25 parts styrene by polymerization in 5.4 hours at 10° C. to a 70.5% conversion according to the Recipe 2 of Examples 1 to 10, except for the addition of 7 parts ethanol and the use of 0.20 part t-dodecyl mercaptan instead of 0.30 part, was compounded as follows:

| | Parts |
|---|---|
| Polymer | 100.0 |
| Carbon black | 50.0 |
| Zinc oxide | 5.0 |
| Softener [1] | 5.0 |
| Stearic acid | 1.5 |
| Accelerator [2] | 1.2 |
| Sulfur | Variable |

[1] Composed largely of a complex group of saturated hydrocarbons from asphaltic crude oil.
[2] Benzothiazyl-2-monocyclohexyl sulfenamide.

A control sample of a synthetic rubber made by polymerizing a mixture of butadiene-1,3 and styrene at 50° C. in an emulsion containing the following:

| | Parts |
|---|---|
| Butadiene-1,3 | 71.0 |
| Styrene | 29.0 |
| Soap flakes | 4.6 |
| Dodecyl mercaptan | 0.5 |
| Potassium persulfate | 0.23 |
| Water | 180.0 | was also compounded according to the recipe above and vulcanized. The physical properties of the vulcanizates of the two samples are compared below:

It will be noted that the stress-strain characteristics of the vulcanizate of Example 11 were greatly superior to those of the control in both the tensile strength and the elongation. The permanent set is also less than that of the control (a highly desirable property). It will be especially noted that the hysteresis is somewhat better and that the flex-life is 46% better than that of the control. (It is highly desirable that a polymer vulcanizate have a combination of low hysteresis and long flex-life.) Thus, the method of this invention yields polymers having more desirable properties than the polymers secured by polymerization in the conventional manner.

Various other modifications and variations in the invention as described hereinabove will occur to those skilled in the art. For example, since the polymerizations of this invention are so rapid, they may be adapted to continuous "pipe-line" polymerization. Moreover, the polymerization mixture may be "built-up" by adding one or more of the ingredients, including the polymerization initiators of this invention, continuously or in incremental portions during the course of the reaction.

Further variations and modifications in the procedures herein described are possible without departing from the spirit and scope of the invention as defined by the appended claims.

We claim:

1. The process which comprises polymerizing a monomeric material comprising a butadiene-1,3 hydrocarbon in aqueous emulsion at a temperature of from 10 to 100° C. and in the presence of (1) a diazomercapto compound of the general structure Ar—N=N—S—R wherein Ar is a monovalent aromatic radical having its valence on a nuclear carbon atom and R is a monovalent organic radical having its connecting valence on a carbon atom and derived by removing the (SH)-group from an organic mercaptan selected from the class consisting of aliphatic, aromatic and heterocyclic mercaptans, (2) a liquid water-miscible aliphatic alcohol composed exclusively of carbon, hydrogen and oxy-oxygen atoms in catalytic amounts ranging from as little as one % to as much as twenty-five % by weight based on the total monomeric material, and (3) a water-soluble ferricyanide.

2. The process which comprises polymerizing butadiene-1,3 and styrene in aqueous emulson at a temperature of from 10 to 40° C. and in the presence of (1) a diazomercapto compound of the general structure Ar—N=N—S—R wherein

| | | Vulcanizate of this Example | Control |
|---|---|---|---|
| Parts Sulfur | | 1.25 | 1.75 |
| Vulcanization: | | | |
| for 75 minutes at 280° F | Modulus at 300% Elongation (lbs./sq. in.) | 950 | 600 |
| | Tensile (lbs./sq. in.) | 5,380 | 3,400 |
| | Elongation at Break (Per Cent) | 740 | 845 |
| for 150 minutes at 280° F | Modulus at 300% Elongation (lbs./sq. in.) | 1,025 | 900 |
| | Tensile (lbs./sq. in.) | 5,550 | 3,880 |
| | Elongation at Break (Per Cent) | 720 | 720 |
| Shore Hardness: | | | |
| after 75' Cure | | 58 | 57 |
| after 150' Cure | | 62 | 60 |
| Permanent Set (Per Cent): | | | |
| after 75' Cure | | 19.0 | 28.7 |
| after 150' Cure | | 9.1 | 15.4 |
| Hysteresis ($\Delta T$, °F): | | | |
| after 75' Cure | | 79 | 78 |
| after 150' Cure | | 59 | 65 |
| Flex-life$\times 10^{-3}$ (in standard test): | | | |
| after 75' Cure | | 600 | 410 |
| after 150' Cure | | 400 | 290 |

Ar is a monovalent aromatic radical having its connecting valence on a nuclear carbon atom and R is a monovalent organic radical having its connecting valence on a carbon atom and derived by removing the (SH)-group from an organic mercaptan selected from the class consisting of aliphatic, aromatic and heterocyclic mercaptans, (2) a liquid water-miscible aliphatic alcohol composed exclusively of carbon, hydrogen and oxy-oxygen atoms in catalytic amounts ranging from as little as one to as much as twenty-five % by weight based on the total weight of butadiene-1,3 and styrene, and (3) a water-soluble ferricyanide.

3. The process which comprises polymerizing a monomeric material comprising a butadiene-1,3 hydrocarbon at a temperature of from 10 to 40° C. and in the presence of (1) a diazomercapto compound of the general structure $$Ar-N=N-S-R$$

wherein Ar is a monovalent aromatic radical having its connecting valence on a nuclear carbon atom and R is a cyclic group having its connecting valence on a carbon atom and derived by removing the (SH)-group from cyclic mercaptan, (2) a liquid water-miscible aliphatic alcohol composed exclusively of carbon, hydrogen and oxy-oxygen atoms in amount ranging from one to twenty-five parts by weight per one hundred parts of monomeric material, and (3) a water-soluble ferricyanide.

4. The process which comprises polymerizing a monomeric material comprising a butadiene-1,3 hydrocarbon in aqueous emulsion at a temperature of from 10 to 40° C. and in the presence of (1) a diazomercapto compound of the general structure Ar—N=N—S—R wherein Ar is a monovalent aromatic radical having its connecting valence on a nuclear carbon atom and R is an aryl group having its connecting valence on a nuclear carbon atom, (2) a liquid water-miscible aliphatic alcohol composed exclusively of carbon, hydrogen and oxy-oxygen atoms in amount ranging from one to twenty-five parts by weight per 100 parts of monomeric material and (3) a water-soluble ferricyanide.

5. The process which comprises polymerizing a monomeric material comprising a butadiene-1,3 hydrocarbon in aqueous emulsion at a temperature of from 10 to 40° C., and in the presence of (1) a diazomercapto compound of the general structure Ar—N=N—S—R wherein Ar is a monovalent aromatic radical having its connecting valence on a nuclear carbon atom and R is a naphthyl group having its connecting valence on a nuclear carbon atom, (2) a liquid water-miscible aliphatic alcohol composed exclusively of carbon, hydrogen and oxy-oxygen atoms in amount ranging from one to twenty-five parts by weight per 100 parts of monomeric material, and (3) a water-soluble ferricyanide.

6. The process which comprises polymerizing a monomeric material comprising a butadiene-1,3 hydrocarbon in aqueous emulsion at a temperature of from 10 to 40° C. and in the presence of (1) 2-(4-methoxybenzenediazomercapto) naphthalene, (2) a liquid water-miscible aliphatic alcohol composed exclusively of carbon, hydrogen and oxy-oxygen atoms, in amount ranging from one to twenty-five parts by weight per 100 parts of monomeric material, and (3) a water-soluble ferricyanide.

7. The process which comprises polymerizing a monomeric material comprising a butadiene-1,3 hydrocarbon in aqueous emulsion at a temperature of from 10 to 40° C. and in the presence of 2-(4-methoxybenzenediazomercapto) naphthalene, from one to twenty-five parts by weight per 100 parts of monomeric material of ethyl alcohol, and potassium ferricyanide.

8. The process which comprises polymerizing a monomeric material comprising a butadiene-1,3 in aqueous emulsion at a temperature of from 10 to 40° and in the presence of (1) 2-4-methoxybenzenediazomercapto) naphthalene, (2) a liquid water-miscible aliphatic alcohol composed exclusively of carbon, hydrogen and oxy-oxygen atoms in an amount from one to twenty-five parts by weight per 100 parts by weight of monomeric material, (3) a water-soluble ferricyanide, and (4) a mercaptan containing from four to sixteen carbon atoms.

9. The process of claim 7 in which the monomeric material comprises butadiene-1,3 and styrene.

HAROLD P. BROWN.
ROBERT J. HOUSTON.

REFERENCES CITED

The following references are of record in the file of this patent:

UNITED STATES PATENTS

| Number | Name | Date |
|---|---|---|
| 2,251,156 | Nygaard | July 29, 1941 |
| 2,376,963 | Garvey | May 29, 1945 |
| 2,397,201 | Pfau | Mar. 26, 1946 |
| 2,417,034 | Youker | Mar. 4, 1947 |
| 2,508,734 | Troyan | May 23, 1950 |

OTHER REFERENCES

Troyan, article in Rubber Age, August 1948, pages 585–595.

Certificate of Correction

Patent No. 2,566,821 September 4, 1951

HAROLD P. BROWN ET AL.

It is hereby certified that error appears in the printed specification of the above numbered patent requiring correction as follows:

Column 3, line 32, for "(4-sulfobenediazomercapto)" read *(4-sulfobenzenediazomercapto)*; column 7, line 56, for "process" read *presence*; column 8, line 39, strike out "acrylonitrile polymerized at 30° C. to a yield of"; column 12, line 28, for "40°" read *40° C.*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*